United States Patent
Ackley, Jr.

(10) Patent No.: US 8,141,697 B2
(45) Date of Patent: Mar. 27, 2012

(54) METHOD AND APPARATUS FOR TRANSPORTING CAPLETS

(75) Inventor: E. Michael Ackley, Jr., Mannington, NJ (US)

(73) Assignee: Ackley Machine Corporation, Moorestown, NJ (US)

( * ) Notice: Subject to any disclaimer, the term of this patent is extended or adjusted under 35 U.S.C. 154(b) by 250 days.

(21) Appl. No.: 12/588,021

(22) Filed: Oct. 1, 2009

(65) Prior Publication Data

US 2010/0252401 A1     Oct. 7, 2010

Related U.S. Application Data

(63) Continuation-in-part of application No. 29/311,505, filed on Apr. 3, 2009, now Pat. No. Des. 603,885.

(51) Int. Cl.
 *B65G 13/02* (2006.01)

(52) U.S. Cl. .............. 198/803.14; 198/867.11

(58) Field of Classification Search .......... 198/867.11, 198/867.14, 803.2, 803.14
See application file for complete search history.

(56) References Cited

U.S. PATENT DOCUMENTS

| | | | |
|---|---|---|---|
| 2,785,786 A * | 3/1957 | Bartlett | 198/803.14 |
| 3,655,110 A | 4/1972 | Eisenbach | |
| 3,884,143 A | 5/1975 | Ackley | |
| 4,394,933 A * | 7/1983 | Ackley | 198/377.01 |
| 4,632,028 A | 12/1986 | Ackley | |
| 5,630,499 A | 5/1997 | Louden et al. | |
| 5,836,243 A | 11/1998 | Ackley | |
| 5,988,364 A * | 11/1999 | Boyce et al. | 198/867.15 |
| 5,996,768 A * | 12/1999 | Boyce et al. | 198/867.11 |
| D432,341 S | 10/2000 | Shimbo et al. | |
| 6,314,876 B1 | 11/2001 | Ackley | |
| 6,360,866 B1 | 3/2002 | Chiba et al. | |
| 6,409,030 B1 | 6/2002 | Schlemper | |
| D463,977 S | 10/2002 | Castellanos et al. | |
| 6,568,151 B2 * | 5/2003 | Buckley et al. | 198/803.14 |
| D482,963 S | 12/2003 | Vincent et al. | |
| 6,834,581 B2 | 12/2004 | Ackley | |
| 7,102,741 B2 | 9/2006 | Ackley, Jr. et al. | |
| 7,114,445 B2 | 10/2006 | Ackley, Jr. et al. | |
| D543,103 S | 5/2007 | Roche et al. | |
| D545,096 S | 6/2007 | Simpson et al. | |
| 7,456,946 B2 | 11/2008 | Ackley, Jr. et al. | |
| 2008/0028955 A1 | 2/2008 | Bauer et al. | |
| 2008/0047803 A1 | 2/2008 | Ackley, Jr. | |

* cited by examiner

*Primary Examiner* — James R Bidwell
(74) *Attorney, Agent, or Firm* — Nixon & Vanderhye PC

(57) ABSTRACT

A carrier bar for conveying at least one caplet along a predetermined conveyer path includes at least one pocket adapted to receive a caplet. Each pocket includes a longitudinal axis that is angled or offset from a direction of travel of the carrier bar in use. Each caplet includes a first side, a second side opposite the first side, and a belly band that interconnects the first and second sides.

20 Claims, 7 Drawing Sheets

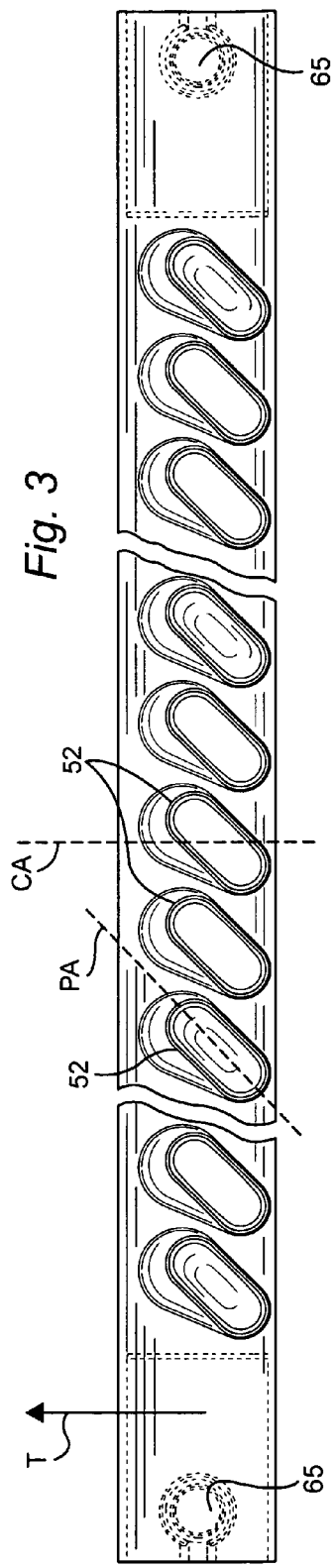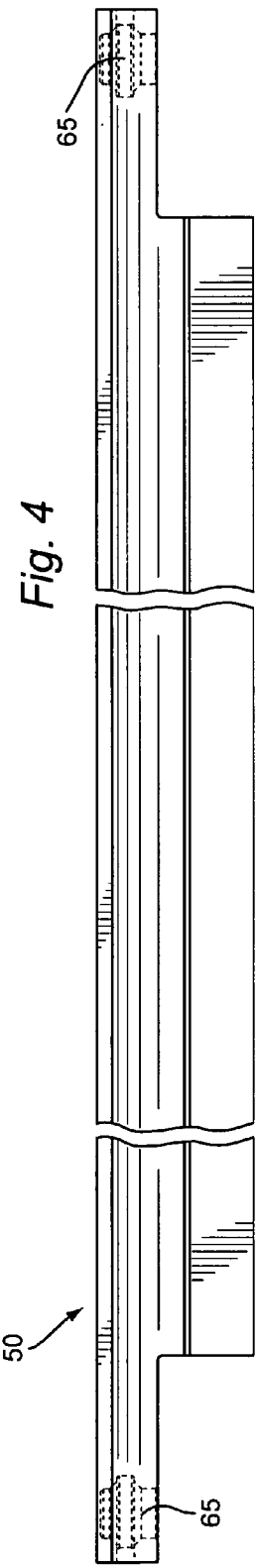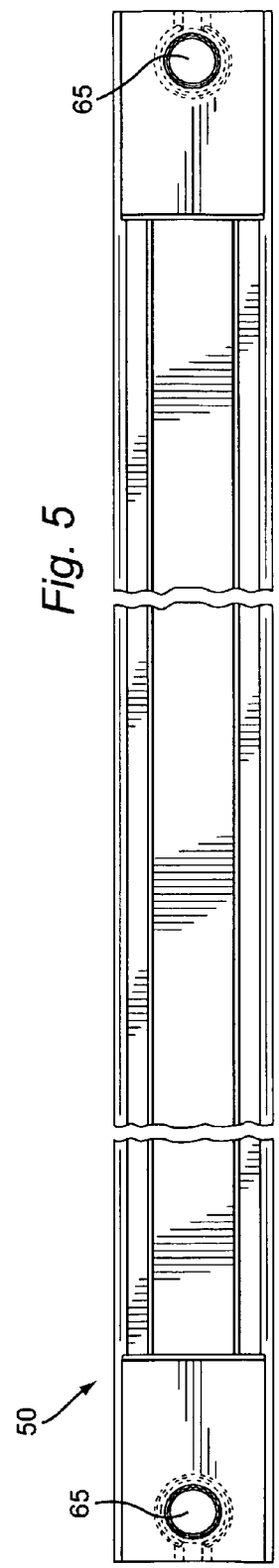

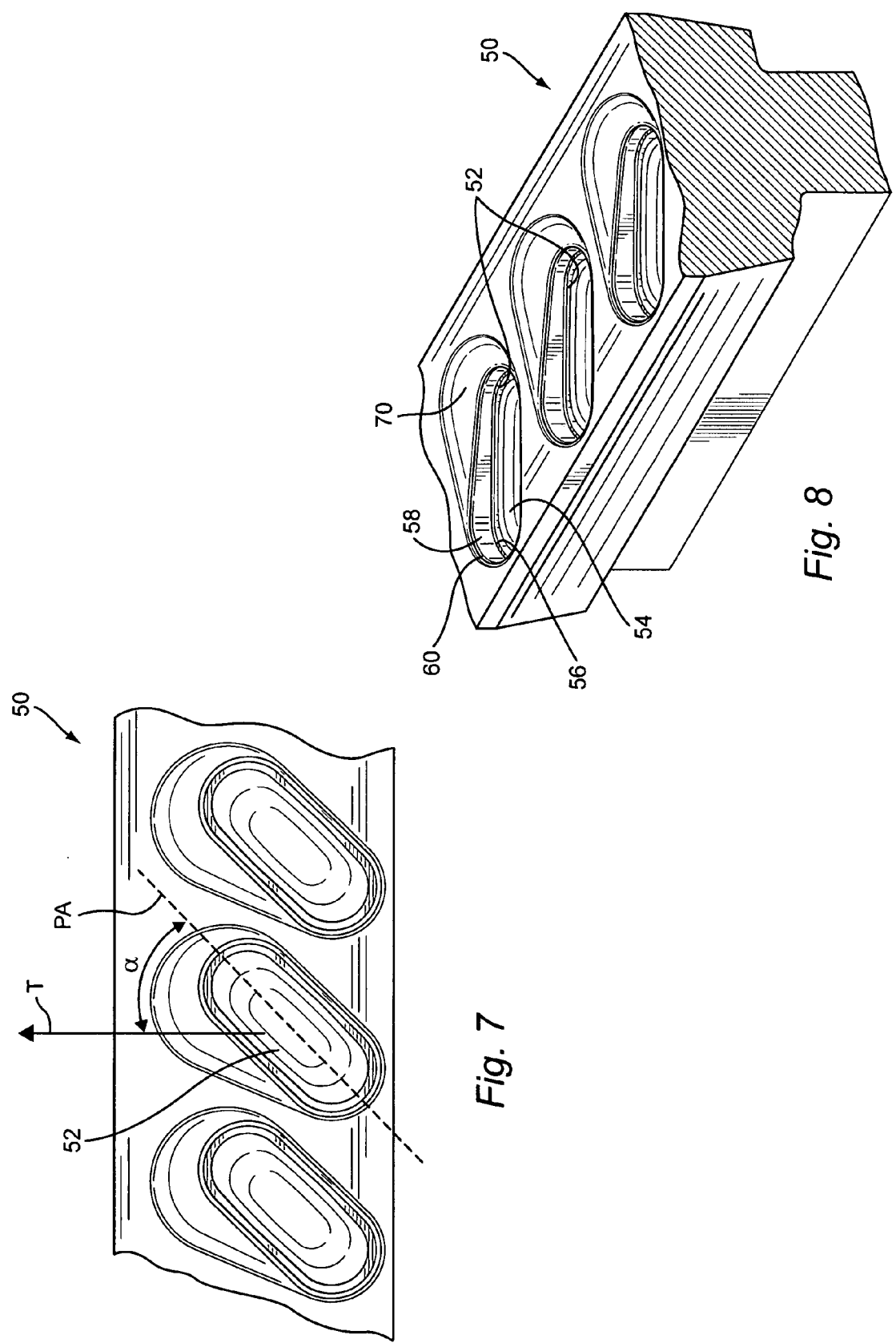

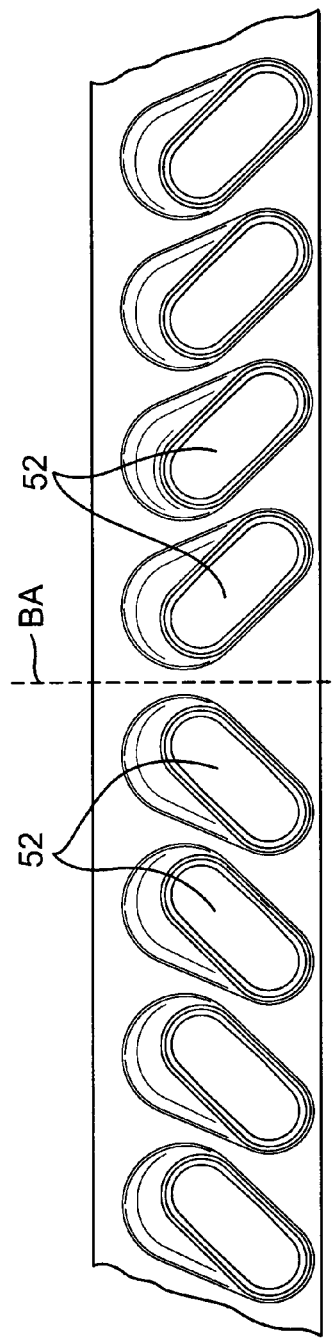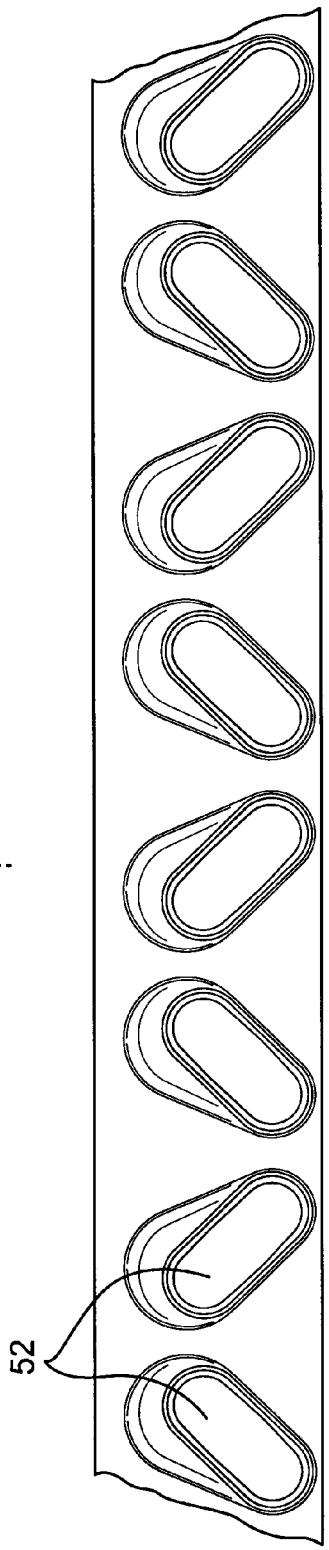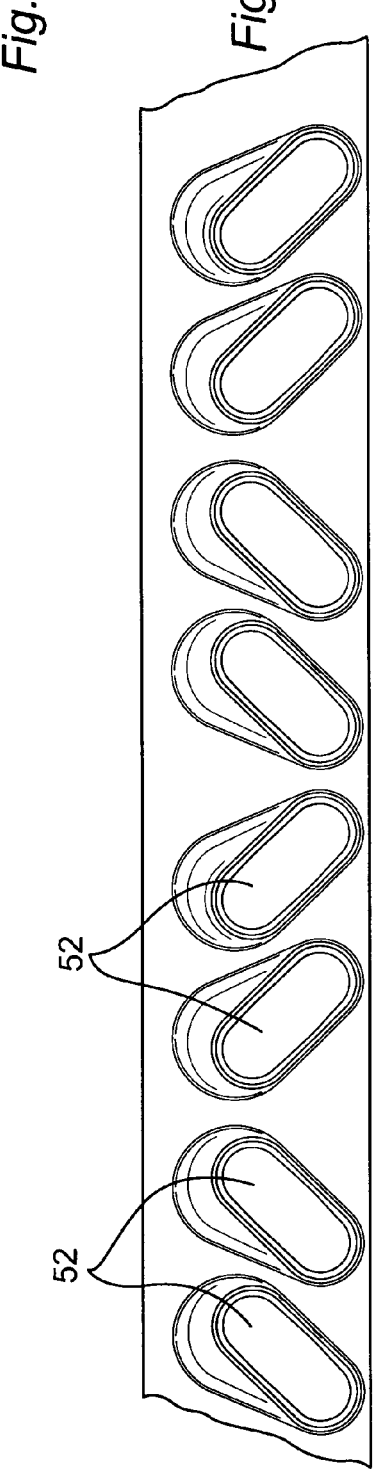

METHOD AND APPARATUS FOR TRANSPORTING CAPLETS

CROSS-REFERENCE TO APPLICATION

This application is a continuation-in-part of U.S. Design Application No. 29/311,505, filed Apr. 3, 2009, which is incorporated herein by reference in its entirety.

FIELD OF THE INVENTION

The present invention relates to methods and apparatuses for transporting caplets, e.g., pharmaceutical caplets.

BACKGROUND OF THE INVENTION

Processing of caplets, such as marking the caplets with indicia, coloring the caplets, laser drilling holes in the caplets, and/or coating the caplets, is known in the art. The caplets may be transported past one or more processing stations (e.g., printing, inspection, drilling, etc.) by carrier bars provided with one or more caplet receiving pockets.

In a typical application, the carrier bars are transported along an endless path conveyer including a ramped section and a downstream horizontal section. The ramped section includes a hopper which is at least partly filled with the caplets. Ideally, the caplets are seated within the pockets such that in the horizontal section a smooth processing surface is presented to the processing station (i.e., the belly band is not presented to the processing station(s)). Achieving a high fill rate proves difficult due to the processing speed of the conveyer and the shape of the caplet. Thus, due to improper and/or unsecure seating in the carrier bar, the caplet is often improperly processed along the belly band of the caplet and/or knocked out of the pocket during processing.

Thus, there is a need in the art for an improved method and apparatus for transporting caplets that does not suffer from the above-mentioned drawbacks.

SUMMARY OF THE INVENTION

One aspect of the invention relates to a carrier bar for conveying at least one caplet along a predetermined conveyer path. Each caplet includes a first side, a second side opposite the first side, and a belly band that interconnects the first and second sides. The carrier bar includes at least one pocket adapted to receive a caplet. Each pocket includes a longitudinal axis that is angled or offset from a direction of travel of the carrier bar in use.

Another aspect of the invention relates to a carrier bar for conveying at least one caplet. The carrier bar includes at least one pocket adapted to receive a caplet. Each pocket includes a longitudinal axis that is angled or offset from a transverse axis of the carrier bar.

Another aspect of the invention relates to a method for processing a caplet including conveying the caplet within a pocket of a carrier bar along a direction of travel so that a longitudinal axis of the pocket is angled or offset from the direction of travel.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3 is a top view of a carrier bar according to an embodiment of the present invention;

FIG. 4 is a front view of the carrier bar of FIG. 3;

FIG. 5 is a bottom view of the carrier bar of FIG. 3;

FIG. 7 is an enlarged top view of a portion of the carrier bar of FIG. 3;

FIG. 8 is a perspective view of a portion of the carrier bar of FIG. 3;

FIG. 13 is a schematic top view of a carrier bar including an arrangement of pockets according to an embodiment of the present invention;

FIG. 14 is a schematic top view of a carrier bar including an arrangement of pockets according to another embodiment of the present invention; and FIG. 15 is a schematic top view of a carrier bar including an arrangement of pockets according to another embodiment of the present invention.

DETAILED DESCRIPTION OF ILLUSTRATED EMBODIMENTS

The following description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

Figure 1:
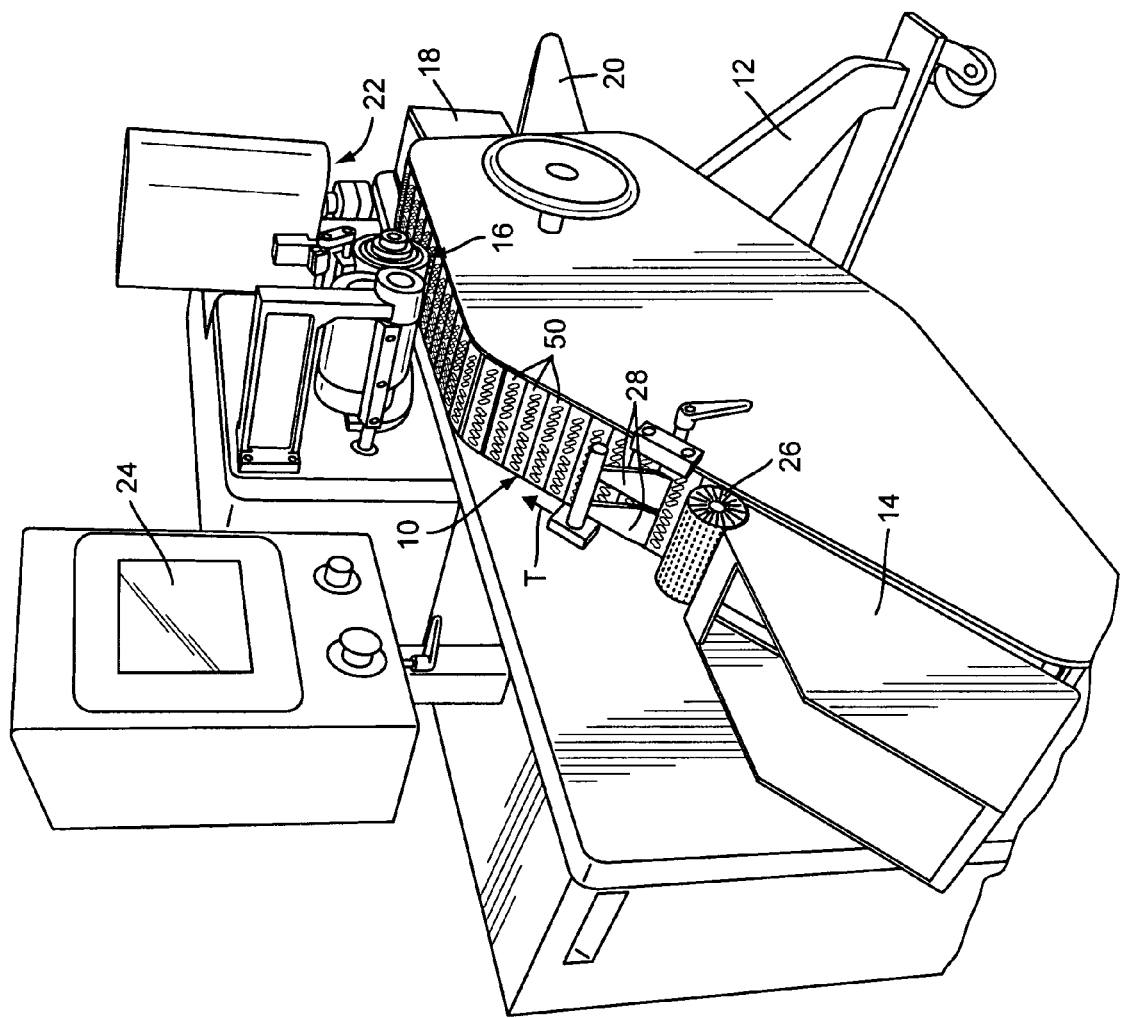
FIG. 1 is a perspective view of a conveyer apparatus for conveying a plurality of pellet-shaped articles according to an embodiment of the present invention.

FIG. 1 illustrates a conveyer apparatus 10 including a plurality of carrier bars 50 structured to transport or convey a plurality of pellet-shaped articles along a predetermined conveyer path. In the illustrated embodiment, the pellet-shaped articles are in the form of caplets as described below. However, it should be appreciated that the carrier bars 50 may be adapted for use with other pellet-shaped articles, e.g., capsules, pills, tablets, etc.

As described in greater detail below, each carrier bar 50 is structured to receive and positively seat the caplets within respective pockets of the carrier bar in a manner that ensures that a side of each caplet (and not the belly band) is viewable or exposed for processing operations such as marking, drilling, and/or inspecting.

Figure 2B:
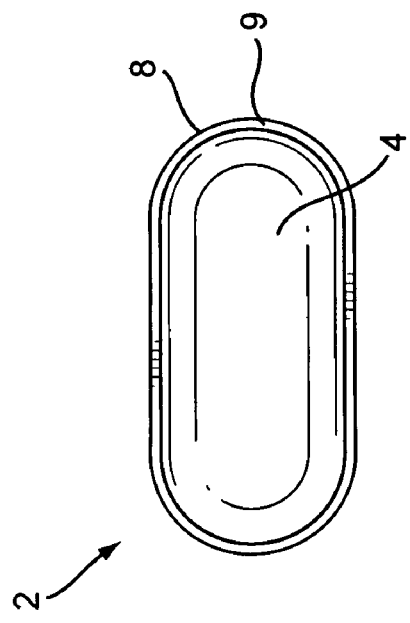
FIG. 2B is a top view of a caplet.
Figure 2A:
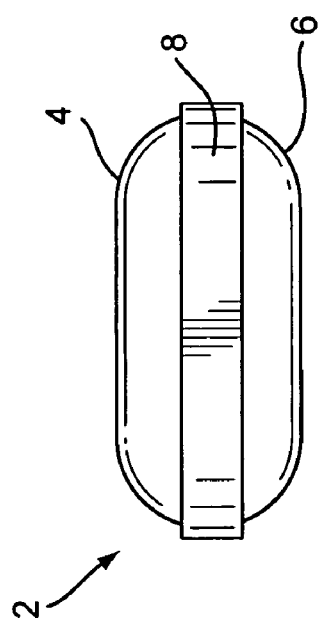
FIG. 2A is a side view of a caplet.
Figure 6:
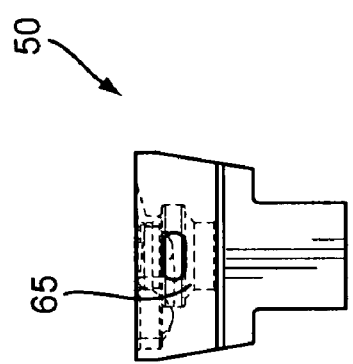
FIG. 6 is a side view of the carrier bar of FIG. 3.

As best shown in FIGS. 2A and 2B, each caplet 2 includes an elongated main body with a first side 4, a second side 6 opposite the first side, and a belly band 8 that interconnects the first and second sides. The first and second sides may have a convex configuration, and the width of the belly band may vary. Also, the belly band may protrude laterally from the first and second sides to define a laterally extending edge 9.

As shown in FIG. 1, the conveyer apparatus 10 is supported upon a frame 12 that is also structured to support a feed hopper 14, a processing station 16 (e.g., marking apparatus with offset rollers as illustrated, however marking apparatus may include a laser printer), first and second bins 18, 20 where caplets are collected, and an inspection unit 22. A display monitor 24 may extend from the frame and displays diagnostic information to an operator.

The feed hopper 14 is disposed over a ramped section of the conveyer apparatus to receive a supply of caplets and deliver the caplets onto the conveyer apparatus. As the conveyer apparatus is drawn beneath the feed hopper 14, the carrier bars 50 will become filled with caplets. Before proceeding from beneath the feed hopper 14, the carrier bars 50 and the caplets will encounter a seating member to assist in seating the caplets within the pockets of the carrier bars. In the illustrated embodiment, the seating member is in the form of a brush 26 that rotates, e.g., in an opposite direction than the direction of transport of the caplets. The brush 26 operates to assist in seating the caplets within the pockets, and operates to return caplets to the feed hopper that have not been received within one of a plurality of caplet receiving pockets provided in the carrier bars. Alternatively or in addition to the brush, the seating member may include one or more fingers provided downstream from the feed hopper to assist in seating the caplets. After the carrier bars pass by the seating member, they pass under one or more blow-back members 28 (e.g., air nozzles) structured to dislodge any articles seated within the pockets of the carrier bars, e.g., when performing diagnostic tests or cleaning the conveyer. Further details of such an arrangement are disclosed in U.S. Pat. No. 7,102,741, which is incorporated herein by reference in its entirety.

FIGS. 3 to 9 show a carrier bar 50 according to an embodiment of the present invention. As illustrated, each carrier bar 50 is provided with one or more caplet receiving pockets 52, disposed along their length. Each pocket 52 is arranged or oriented such that a longitudinal axis PA of the pocket is angled, offset, or unaligned from the direction of travel (as indicated by the arrows T in FIGS. 1 and 3) of the carrier bar.

Figures 10, 11, 12:
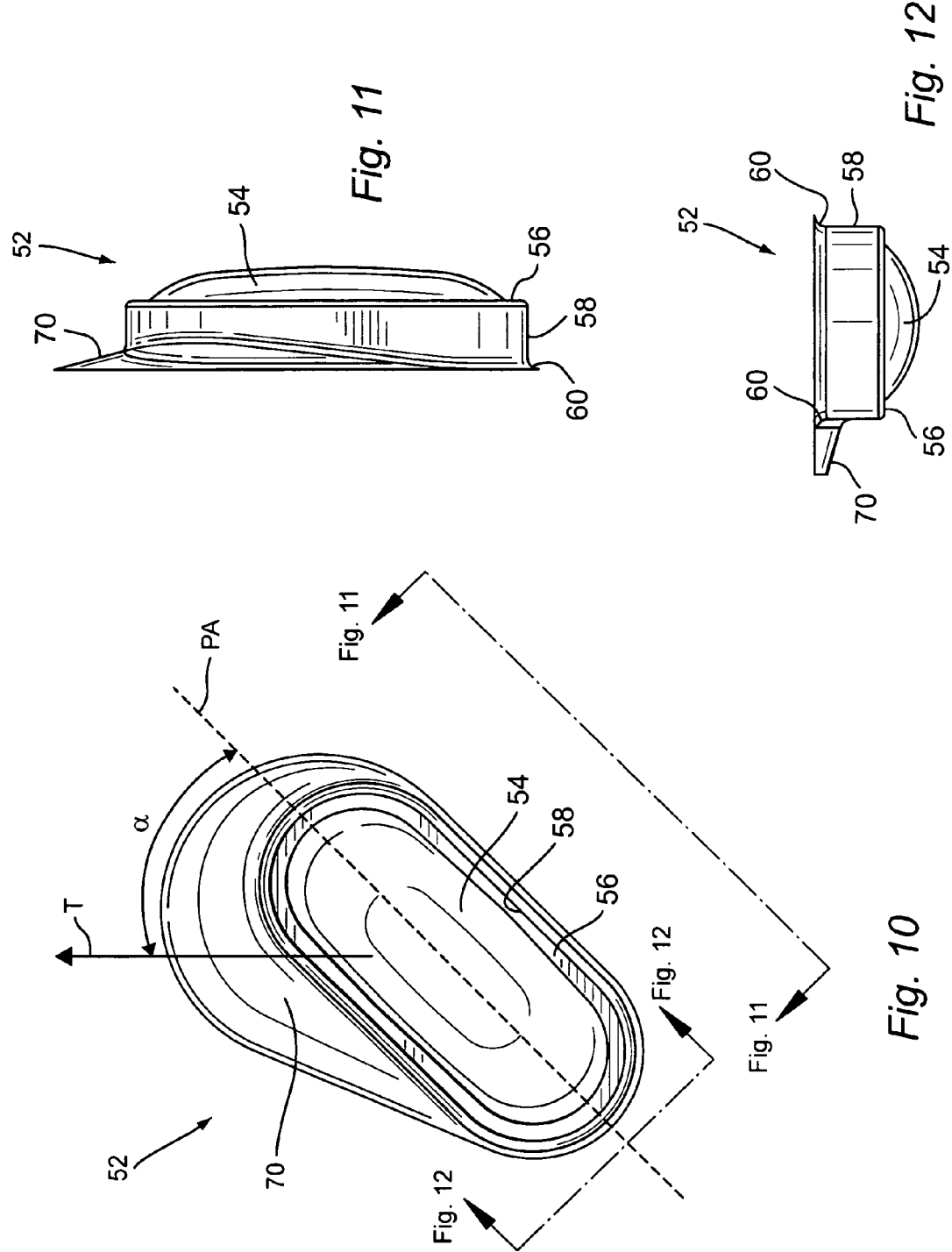
FIG. 10 is an enlarged top view of a pocket of the carrier bar of FIG. 3.
FIG. 11 is a view along line 11-11 of FIG. 10.
FIG. 12 is a view along line 12-12 of FIG. 10.

Specifically, the direction of travel T of each carrier bar 50 is aligned with a transverse axis CA of the carrier bar. The longitudinal axis PA of each pocket 52 extends at an angle from the transverse axis CA of the carrier bar. Such angled or offset orientation of the pocket 52 helps to properly seat and retain a caplet within the pocket such that the first or second side 4, 6 of the caplet (and not the belly band 8) is viewable or exposed for processing operations such as marking and/or inspecting. In an embodiment as best shown in FIGS. 7 and 10, the longitudinal axis PA of the pocket may be oriented at an angle $\alpha$ of about 5-70° (e.g., 15-50°, 30-45°) with respect to the direction of travel T or transverse axis of the carrier bar. As described below, the pocket may be oriented in either direction of the direction of travel or transverse axis, i.e., offset to the right or left of the transverse axis.

As best shown in FIGS. 8 and 10 to 12, each pocket 52 includes a concave or rounded bottom surface 54 that substantially matches the shape of the convex exterior surface of the first and second sides 4, 6 of the caplet. Each pocket 52 also includes a belly band receiving flange 56 that extends radially outwardly from the bottom surface, and a peripheral surface 58 extending upwardly from the flange 56 towards the pocket opening. The flange 56 substantially matches the lateral extent of the laterally extending edge 9 of the belly band 8, and the peripheral surface 58 substantially matches the width of the belly band 8. Thus, the pocket 52 is suitably shaped or contoured to substantially conform to the exterior shape of the belly band 8 and one side 4, 6 of the caplet 2, thereby allowing the other side 4, 6 of the caplet to extend from the upper exterior surface of the carrier bar, i.e., other side of the caplet is sufficiently exposed for processing operations.

The pocket 52 holds the caplet in a horizontal position, and the peripheral surface 58 surrounds the belly band 8 to help maintain the caplet in such position in a stable manner, e.g., prevent movement during processing. A small clearance may be provided between the caplet and peripheral surface to facilitate entry/exit of the caplet into the pocket.

As shown in FIGS. 11 and 12, edges 60 of the pocket adjacent the upper surface of the carrier bar may be chamfered or tapered to facilitate entry of the caplet into the pocket.

In addition, a lead-in surface 70 is provided in the upper surface of the carrier bar and extends into leading edges of the pocket. As viewed from above in FIG. 10, the lead-in surface 70 includes a general sector-shape including a generally semi-circular portion that proceeds into the leading edges of the pocket. The lead-in surface 70 provides a ramped or declined surface (e.g., see FIGS. 11 and 12) into the pocket to facilitate entry of the caplet into the pocket. The ramp angle may vary from about 5-50°.

As noted above, the pocket 52 is arranged so that one side of the caplet extends from the top of the carrier bar. This is advantageous during the caplet loading step, e.g., where a hopper is located. The hopper can be configured to receive a number of caplets in random order, in which the hopper has a bottom opening that places a plurality of caplets in communication with the upper surfaces of a plurality of carrier bars. Once a caplet is seated within a pocket 52 while in the hopper, the top of the caplet that is exposed can then contact the remaining non-seated caplets in the hopper. The result is that the non-seated caplets are agitated or otherwise moved, which in turn helps to rotate and properly seat the seated caplet within the respective pocket, i.e., belly band side not exposed.

Moreover, the angled or offset orientation of the pockets along with gravity helps to positively pick up and properly seat the caplets with the pockets. That is, the angled or offset orientation of the pockets exposes a larger surface area of a seated caplet to the direction of travel (i.e., compared to a pocket in which the longitudinal axis is aligned with the direction of travel), which helps to properly seat the caplet. In addition, such pocket configuration positively retains the caplet within the pocket which substantially prevents the caplet from being rotated and/or knocked out of the pocket once properly seated in production.

Each carrier bar may have a single pocket or may have a plurality of pockets (e.g., 2-30 pockets or more, e.g., 10-15 pockets, 20-25 pockets, etc.) disposed along its length. Also, pockets of each carrier may be oriented in the same direction and/or may be oriented in opposite directions.

Figure 9:
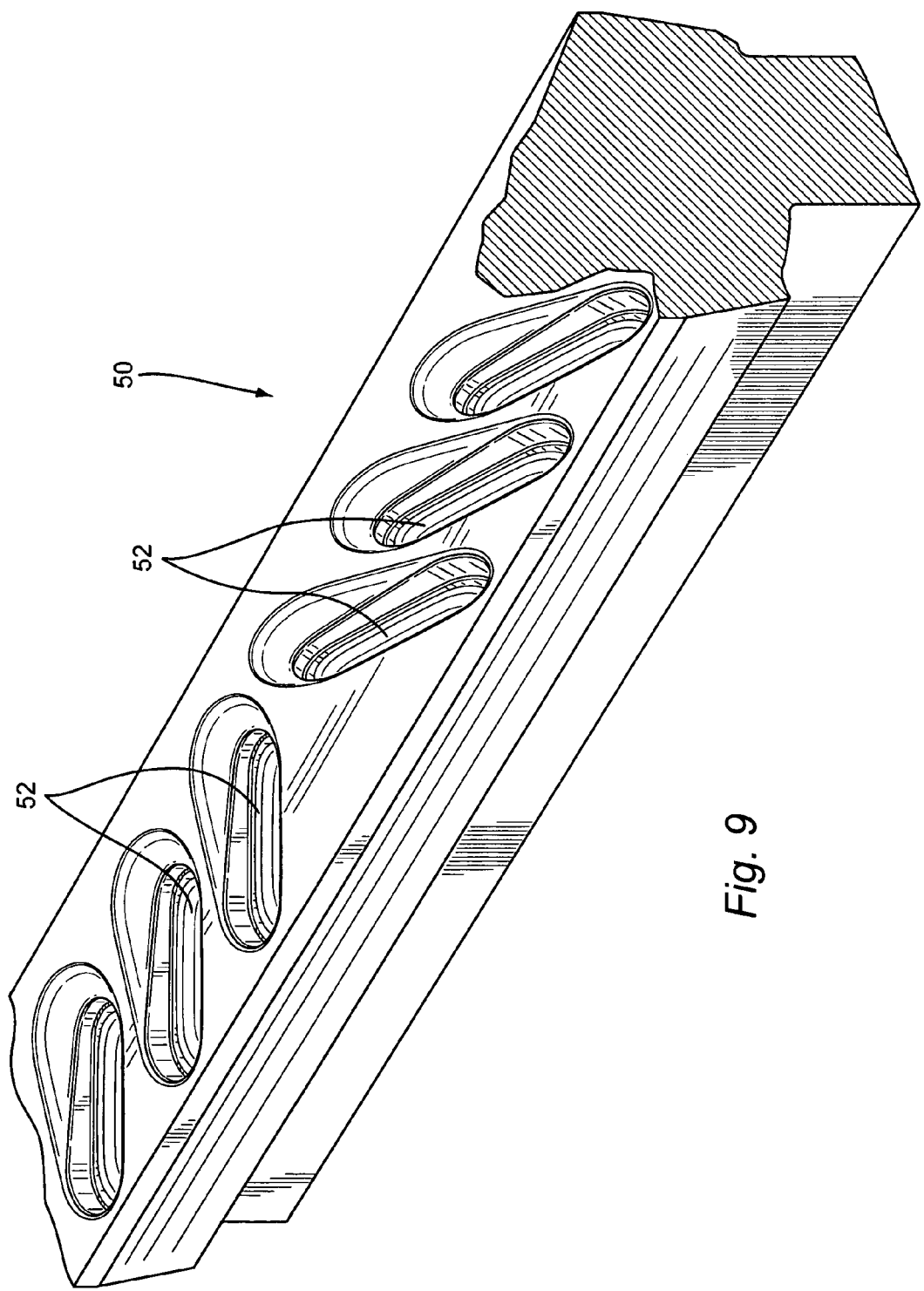
FIG. 9 is a another perspective view of a portion of the carrier bar of FIG. 3.

For example, FIG. 3 illustrates a plurality of pockets oriented or angled in the same direction along the length of the carrier bar. FIGS. 1, 9, and 13 illustrate an arrangement in which the pockets are oriented in mirror image about a center axis BA of the carrier bar, e.g., a plurality of pockets oriented in one direction on one side of the axis and a plurality of pockets oriented in the opposite direction on the other side of the axis. FIG. 14 illustrates an arrangement in which pairs of oppositely oriented pockets are arranged along the length of the carrier bar. FIG. 15 illustrates a similar arrangement to FIG. 14, but two pairs of oppositely oriented pockets are arranged along the length.

Also, the angle of the pockets may be same or may be varied with respect to one another.

In addition, the upper and lower edges of the pockets may be aligned as illustrated, or the pockets may be staggered along the length of the carrier bar.

The conveyer is in the form of a continuous chain conveyer disposed upon appropriately positioned sprockets. A motor unit is provided to operate the chain conveyer in a predetermined direction. The chain conveyer is constructed and arranged to mount, e.g., and releasably mount, the carrier bars. For example, each lateral side of the carrier bar is provided with a respective pin hole 65 adapted to receive respective mounting pins, e.g. of a quick-release system. Further details of such quick-release system are provided in U.S. Pat. No. 5,630,499, which is incorporated herein by reference in its entirety.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A carrier bar for conveying at least one caplet along a predetermined conveyer path, each caplet including a first side, a second side opposite the first side, and a belly band that interconnects the first and second sides, the carrier bar comprising:
   at least one pocket adapted to receive a caplet, each pocket including a longitudinal axis that is angled or offset from a direction of travel of the carrier bar in use.

2. A carrier bar according to claim 1, wherein the longitudinal axis of the pocket is angled or offset from a transverse axis of the carrier bar.

3. A carrier bar according to claim 1, wherein the longitudinal axis of the pocket is oriented about 5-70° from the direction of travel.

4. A carrier bar according to claim 1, wherein the pocket is shaped or contoured to substantially match the shape of the belly band and one side of the caplet.

5. A carrier bar according to claim 4, wherein the pocket allows the other side of the caplet to extend from an upper exterior surface of the carrier bar in use.

6. A carrier bar according to claim 1, further comprising a lead-in surface provided to an upper exterior surface of the carrier bar that extends in leading edges of the pocket.

7. A carrier bar according to claim 6, wherein the lead-in surface includes a general sector shape when viewed from above.

8. A carrier bar according to claim 6, wherein the lead-in surface provides a ramped or declined surface into the pocket.

9. A carrier bar according to claim 8, wherein the lead-in surface includes a ramp angle of about 5-50°.

10. A carrier bar according to claim 1, wherein the pockets are oriented or angled in the same direction along a length of the carrier bar.

11. A carrier bar according to claim 1, wherein the pockets are oriented in mirror image about a center axis of the carrier bar.

12. A carrier bar according to claim 11, wherein a plurality of pockets are oriented in one direction on one side of the axis and a plurality of pockets are oriented in the opposite direction on the other side of the axis.

13. A conveyer apparatus for transporting caplets comprising a carrier bar according to claim 1.

14. A carrier bar for conveying at least one caplet, the carrier bar comprising:
   an upper surface defining a plane; and
   at least one pocket recessed within the upper surface and adapted to receive a caplet, each pocket including a longitudinal axis extending substantially within or parallel to the plane of the carrier bar and being angled or offset from a transverse axis extending substantially within or parallel to the plane of the carrier bar.

15. A method for processing a caplet including a first side, a second side opposite the first side, and a belly band that interconnects the first and second sides, comprising:
   conveying the caplet within a pocket of a carrier bar along a direction of travel so that a longitudinal axis of the pocket is angled or offset from the direction of travel.

16. A method according to claim 15, wherein conveying includes conveying the caplet so that the longitudinal axis of the pocket is angled or offset from a transverse axis of the carrier bar.

17. A carrier bar according to claim 14, wherein the carrier bar is generally rectangular with a leading side, a rear side, and lateral sides.

18. A carrier bar according to claim 17, wherein sides of the pocket are parallel to the longitudinal axis and not parallel to the lateral sides of the carrier bar.

19. A carrier bar according to claim 14, further comprising a lead-in surface provided to an upper exterior surface of the carrier bar that extends in leading edges of the pocket.

20. A carrier bar according to claim 19, wherein the lead-in surface includes a general sector shape when viewed from above.

* * * * *